US012198883B2

(12) United States Patent
Oh et al.

(10) Patent No.: US 12,198,883 B2
(45) Date of Patent: Jan. 14, 2025

(54) TRIP DEVICE

(71) Applicant: LS ELECTRIC CO., LTD., Anyang-si (KR)

(72) Inventors: Kyunghwan Oh, Anyang-si (KR); Kihwan Oh, Anyang-si (KR); Younghwan Kim, Anyang-si (KR); Jeongjae Lim, Anyang-si (KR); Yonghun Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 383 days.

(21) Appl. No.: 17/755,951

(22) PCT Filed: Apr. 9, 2020

(86) PCT No.: PCT/KR2020/004815
§ 371 (c)(1),
(2) Date: May 12, 2022

(87) PCT Pub. No.: WO2021/096004
PCT Pub. Date: May 20, 2021

(65) Prior Publication Data

US 2022/0384134 A1 Dec. 1, 2022

(30) Foreign Application Priority Data

Nov. 12, 2019 (KR) ........................ 10-2019-0144521

(51) Int. Cl.
*H01H 71/16* (2006.01)
*H01H 50/18* (2006.01)

(52) U.S. Cl.
CPC ............ *H01H 71/16* (2013.01); *H01H 50/18* (2013.01)

(58) Field of Classification Search
CPC ...................................................... H01H 71/16
(Continued)

(56) References Cited

U.S. PATENT DOCUMENTS 3,422,381 A * 1/1969 Toth .................. H01H 71/1009 335/9
5,831,499 A * 11/1998 Batteux .................. H01H 71/44 335/35
(Continued)

FOREIGN PATENT DOCUMENTS

CN 203038871 U 7/2013
CN 207800523 U 8/2018
(Continued)

OTHER PUBLICATIONS

Notice of Allowance for related Japanese Application No. 2022-523378; action dated Nov. 22, 2023; (3 pages).
(Continued)

*Primary Examiner* — Alexander Talpalatski
(74) *Attorney, Agent, or Firm* — K&L Gates LLP

(57) ABSTRACT

A trip device is disclosed. The trip device according to an embodiment of the present disclosure comprises an adjustment crossbar. The adjustment crossbar is in contact with or is spaced apart from a shooter and can open or close a breaker having the trip device. The adjustment crossbar is formed by coupling a fixed crossbar and a movable crossbar. The movable crossbar is slidably coupled to the fixed crossbar. The shooter is in contact with the fixed crossbar. Therefore, regardless of the movement of the movable crossbar, the contact between the shooter and the fixed crossbar can be maintained.

13 Claims, 12 Drawing Sheets

(58) Field of Classification Search
USPC ................................................ 335/174, 8–10
See application file for complete search history.

(56) References Cited

U.S. PATENT DOCUMENTS

| | | | | |
|---|---|---|---|---|
| 9,024,711 | B2 * | 5/2015 | Rubbo | H01H 71/40 335/23 |
| 9,378,915 | B2 * | 6/2016 | Augusta | H01H 61/01 |
| 9,558,906 | B2 * | 1/2017 | Augusta | H01H 71/40 |
| 2017/0092454 | A1 | 3/2017 | Kozar et al. | |
| 2017/0323753 | A1 | 11/2017 | Lee | |
| 2018/0061602 | A1 | 3/2018 | Oh | |

FOREIGN PATENT DOCUMENTS

| | | | |
|---|---|---|---|
| JP | 2009135115 | A | 6/2009 |
| JP | 4908536 | B2 | 4/2012 |
| JP | 2014157665 | A | 8/2014 |
| KR | 10-2010-0041570 | A | 4/2010 |
| KR | 20150111473 | A | 10/2015 |
| KR | 1020170076870 | A | 7/2017 |
| KR | 1020170081780 | A | 7/2017 |
| KR | 20170003883 | U | 11/2017 |
| KR | 101823516 | B1 | 1/2018 |

OTHER PUBLICATIONS

Extended European Search Report for related European Application No. 20887582.3; action dated Nov. 24, 2023; (80 pages).
Office Action for related Chinese Application No. 202080078125.X; action dated Apr. 27, 2024; (7 pages).
Office Action for related Japanese Application No. 2022-523378; action dated Mar. 7, 2023; (5 pages).
International Search Report for related International Application No. PCT/KR2020/004815; report dated May 20, 2021; (5 pages).
Written Opinion for related International Application No. PCT/KR2020/004815; report dated May 20, 2021; (4 pages).
Office Action for related Korean Application No. 10-2019-0144521; action dated Dec. 22, 2020; (4 pages).
Notice of Allowance for related Korean Application No. 10-2019-0144521; action dated Jun. 23, 2021; (2 pages).

* cited by examiner

TRIP DEVICE

CROSS-REFERENCE TO RELATED APPLICATIONS

This application is the National Stage filing under 35 U.S.C. 371 of International Application No. PCT/KR2020/004815, filed on Apr. 9, 2020, which claims the benefit of earlier filing date and right of priority to Korea utility model Application No. 10-2019-0144521 filed on Nov. 12, 2019, the contents of which are all hereby incorporated by reference herein in their entirety.

FIELD

The present disclosure relates to a trip device, and more particularly, to a trip device capable of precisely adjusting a trip section and preventing interference by other members when adjusting the trip section.

BACKGROUND

A Molded Case Circuit Breaker (MCCB) is provided on a wiring to automatically break a circuit when an electrical overload condition or a short-circuit accident occurs. Accordingly, damages on circuits and loads connected to the wiring due to an electrical accident can be prevented.

The MCCB has a trip assembly (or trip device). The trip device performs a trip operation of the opening/closing mechanism when the overload condition or a short-circuit accident occurs. The trip device is movably coupled to the MCCB.

The trip device is coupled to a movable contactor, so that the movable contactor can move together with the trip device. When the trip device moves, the movable contactor is brought into contact with or separated from a fixed contactor. Accordingly, the MCCB may be electrically connected to or disconnected from outside.

Referring to FIG. 1, a trip device 1000 according to the related art includes a trip device case 1100, a crossbar 1200, a bimetal 1300, a shooter 1400, and a knob 1500.

When a fault current (large current) flows into the MCCB along a heater 1130, electromagnetic force is generated in a magnet 1120. Accordingly, an armature 1110 is attracted toward the magnet 1120, and one end thereof presses a pushed protrusion 1220 of the crossbar 1200.

In response to this, the crossbar 1200 is rotated to release a contact state between a shooter contact portion 1240 and the shooter 1400. The shooter 1400 is then rotated so that the fixed contactor and the movable contactor are spaced apart from each other.

When an overcurrent (small current) flows into the MCCB along the heater 1130, the bimetal 1300 is curved to press a gap adjusting portion 1210 coupled to the crossbar 1200.

Accordingly, the crossbar 1200 is rotated clockwise in the illustrated implementation, and the contact state between the shooter contact portion 1240 and the shooter 1400 is released. The shooter 1400 is then rotated so that the fixed contactor and the movable contactor are spaced apart from each other.

As described above, the MCCB may perform a trip operation when both the large current and the small current flow. Therefore, in the MCCB, it is needed to set a magnitude of current to be blocked.

Referring to FIG. 2, a trip device 1000 according to the related art includes a knob 1500. The knob 1500 includes a knob adjusting unit 1500 that extends toward the crossbar 1200. The knob adjusting unit 1500 may be coupled to a knob connecting portion 1230 of the crossbar 1200.

The knob 1500 is rotatably coupled to the trip device case 1100. When the knob 1500 is rotated, the crossbar 1200 connected to the knob connection portion 1230 is moved to one side or another side in the extending direction of the crossbar 1200 connected to the knob connecting portion 1230.

At this time, one side surface of the bimetal 1300 facing the gap adjusting portion 1210 is inclined along the direction. Accordingly, a distance between the bimetal 1300 and the gap adjusting portion 1210 can be adjusted according to a position of the gap adjusting portion 1210 in the direction.

However, the crossbar 1200 is moved while the shooter contact portion 1240 and the shooter 1400 are in contact with each other. Accordingly, when the crossbar 1200 is moved, friction may be caused between the shooter contact portion 1240 and the shooter 1400.

This may cause jamming between the shooter contact portion 1240 and the shooter 1400 when the crossbar 1200 is moved in the extending direction. As a result, even when the bimetal 1300 is not curved, there may be a risk that the shooter 1400 arbitrarily performs a trip operation due to the jam.

In addition, a pin made of a conductive material is inserted into the crossbar 1200. Considering that the crossbar 1200 extends along each heater 1130, electrical interference may be caused between phases due to the pin.

Korean Patent Publication No. 10-2017-0076870 discloses an MCCB. Specifically, the prior art document discloses an MCCB that includes a stopping ring for preventing a sliding motion of a crossbar.

However, the prior art document has a limitation in that it does not suggest a method for preventing friction between the crossbar and a shooter.

Korean Patent Publication No. 10-2017-0081870 discloses an MCCB. Specifically, the prior art document discloses an MCCB capable of excluding a knob and the like by fixing an adjustment member.

However, the prior art document has a limitation in that there is no consideration of a method for preventing friction between a crossbar and a shooter.

Moreover, those prior art documents do not suggest a method for preventing electrical interference occurred in each phase by a conductive pin disposed in a crossbar.

Korea Patent Publication No. 10-2017-0076870 (Jun. 5, 2017)

Korea Patent Publication No. 10-2017-0081780 (Jun. 13, 2017)

SUMMARY

The present disclosure is directed to providing a trip device having a structure capable of solving those problems and other drawbacks.

First, an aspect of the present disclosure is to provide a trip device having a structure capable of minimizing friction occurred between a shooter and a crossbar in a process of adjusting a trip section.

Another aspect of the present disclosure is to provide a trip device having a structure in which a bimetal is not arbitrarily curved in a process of adjusting a trip section.

Still another aspect of the present disclosure is to provide a trip device having a structure capable of easily adjusting a trip section.

Still another of the present disclosure is to provide a trip device having a structure capable of smoothly performing a trip operation when an overcurrent or a fault current occurs.

Still another aspect of the present disclosure is to provide a trip device having a structure capable of minimizing electrical interference between currents of different phases when currents of a plurality of phases flow.

In order to achieve those aspects and other advantages of the subject matter disclosed herein, there is provided a trip device that may include a frame, a shooter assembly rotatably coupled to the frame, and an adjustment crossbar rotatably coupled to the frame and configured to be brought into contact with or separated from the shooter assembly. The adjustment crossbar may include a fixed crossbar extending in one direction, the shooter assembly brought into contact with the fixed crossbar, and a movable crossbar extending in the one direction and slidably coupled to the fixed crossbar in the one direction.

The fixed crossbar of the trip device may include an insertion space recessed into one side thereof facing the movable crossbar, and the movable crossbar may include an insertion protrusion protruding from one side thereof facing the fixed crossbar, and inserted into the insertion space.

The insertion space of the adjustment crossbar of the trip device may extend by a predetermined distance in the one direction, and the insertion protrusion may be inserted into the insertion space so as to be slidable in the one direction.

The insertion space of the adjustment crossbar of the trip device may be provided in plurality which are disposed to be spaced apart from one another by predetermined distances, and the insertion protrusion may be provided in plurality to be inserted into the insertion spaces, respectively.

The frame of the trip device may define a predetermined space therein, and the predetermined space may accommodate therein a heater electrically connected to an outside, and a bimetal located adjacent to the heater and configured to be curved toward the adjustment crossbar by heat generated in the heater.

The movable crossbar of the trip device may include a distance adjustment bar extending by a predetermined length in a direction toward the bimetal.

The bimetal of the trip device may be formed to be inclined along the one direction in which the movable crossbar extends such that a distance between the bimetal and an end portion of the distance adjustment bar facing the bimetal is adjusted as the movable crossbar is slid in the one direction.

The frame of the trip device may define a predetermined space therein, and the predetermined space may accommodate therein a heater electrically connected to an outside, a magnet located adjacent to the heater and configured to be magnetized by an electric field formed by a current flowing through the heater, and an armature located adjacent to the magnet and rotatably coupled to the frame.

The armature of the trip device may press the adjustment crossbar to rotate the adjustment crossbar in a direction away from the shooter assembly when the armature is in contact with the adjustment crossbar and rotates toward the magnet by a magnetic force formed by the magnetized magnet.

The armature of the trip device may include an armature rotation shaft rotatably coupled to the frame, and the armature rotation shaft may be located between the magnet and the adjustment crossbar.

The fixed crossbar of the trip device may include a pushed protrusion protruding from one side thereof to be away from the predetermined space of the frame, and the armature may have one end portion facing the adjustment crossbar located adjacent to the pushed protrusion.

The shooter assembly of the trip device may extend toward the fixed crossbar to cover the fixed crossbar, and the fixed crossbar may include a shooter support portion protruding toward the shooter assembly, such that the shooter assembly is seated thereon.

The fixed crossbar of the trip device may include a rotation shaft disposed to protrude from both end portions in a direction in which the fixed crossbar extends, and rotatably coupled to the frame.

An elastic member may be disposed below the shooter assembly to elastically support the shooter assembly, and the shooter assembly may be rotated toward the elastic member when the fixed crossbar is rotated.

According to the present disclosure, the following effects can be achieved.

First, a trip section may be adjusted by an adjustment crossbar. The adjustment crossbar may include a fixed crossbar rotatably coupled to a frame. The fixed crossbar may be supported on the frame so as not to move in an extending direction.

A movable crossbar may be coupled to the fixed crossbar. The movable crossbar may be coupled to the fixed crossbar so as to be slidable along the extending direction.

A shooter assembly may be seated on the fixed crossbar. Accordingly, a contact portion between the shooter assembly and the fixed crossbar may not move along a longitudinal direction of the fixed crossbar. This can prevent an occurrence of friction between the shooter assembly and the fixed crossbar.

With the configuration, the contact portion between the shooter assembly and the fixed crossbar may not be moved along the longitudinal direction of the fixed crossbar. The portion may be rotated away from the shooter assembly only when the shooter assembly performs a trip operation.

This can prevent an occurrence of a jamming phenomenon caused due to the friction between the shooter assembly and the adjustment crossbar even when the trip section is adjusted. Therefore, even if the trip section is adjusted, a bimetal may not be arbitrarily curved.

In addition, a distance adjustment bar with which the bimetal curved is brought into contact may be provided at the movable crossbar. When the movable crossbar is moved in the extending direction, the distance adjustment bar may also be moved along with the movable crossbar in the extending direction.

One side surface of the bimetal facing the distance adjustment bar may be inclined in the extending direction. That is, when the distance adjustment bar is moved in the extending direction, a distance between the bimetal and one side of the distance adjustment bar facing the bimetal may change.

Accordingly, the trip section can be easily adjusted only by moving the movable crossbar.

The adjustment crossbar can be rotated away from the shooter assembly when the bimetal is curved to press the distance adjustment bar. The adjustment crossbar can also be rotated away from the shooter assembly as an armature is rotated toward a magnet.

The shooter assembly may be elastically supported by the elastic member. The elastic member may apply an elastic force in a direction of pulling the shooter assembly. Accordingly, when the adjustment crossbar is rotated, the shooter assembly can be rotated by the elastic force applied by the elastic member and a trip operation can be performed.

Therefore, the adjustment crossbar can be rotated, in response to an occurrence of each of an overcurrent or a fault current, thereby allowing the shooter assembly to smoothly perform a trip operation.

In addition, a conductor member that crosses a plurality of pressing units provided for each phase accommodated in the frame may not be provided inside the adjustment crossbar. That is, the adjustment crossbar can be configured by the combination of the fixed crossbar and the movable crossbar.

The fixed crossbar and the movable crossbar may include a fixed body portion and a movable body portion extending in one direction, respectively. The fixed body portion and the movable body portion may extend across a plurality of pressing units provided for each phase. At this time, the fixed body portion and the movable body portion may be formed of a non-conductive material.

Accordingly, the plurality of pressing units provided in the trip device may not have an electrical influence on each other. This can minimize electrical interference between currents of a plurality of phases even if such currents flow along the trip device.

DETAILED DESCRIPTION

Hereinafter, a trip device 10 according to an implementation of the present disclosure will be described in detail with reference to the accompanying drawings.

In the following description, descriptions of some components will be omitted to help understanding of the present disclosure.

1. Definition of Terms

The term “circuit breaker” used in the following description refers to a device that opens and closes an electric circuit. In one implementation, the circuit breaker may be a molded case circuit breaker (MCCB).

The term “overcurrent” used in the following description means a type of current for operating a circuit breaker. In one implementation, the overcurrent may be classified as a “small current”.

The term “fault current” used in the following description means a type of current for operating a circuit breaker. In one implementation, the overcurrent may be classified as a “large current”.

The terms “top”, “bottom”, “left”, “right”, “front” and “rear” used in the following description will be understood based on a coordinate system illustrated in FIG. 3 and FIGS. 9 to 12.

2. Description of Configuration of Trip Device 10 According to Implementation A trip device 10 according to an implementation may be provided in a circuit breaker to block a circuit when an overcurrent or a fault current occurs. In one implementation, the trip device 10 may be disposed in a molded case circuit breaker.

Figure 1:
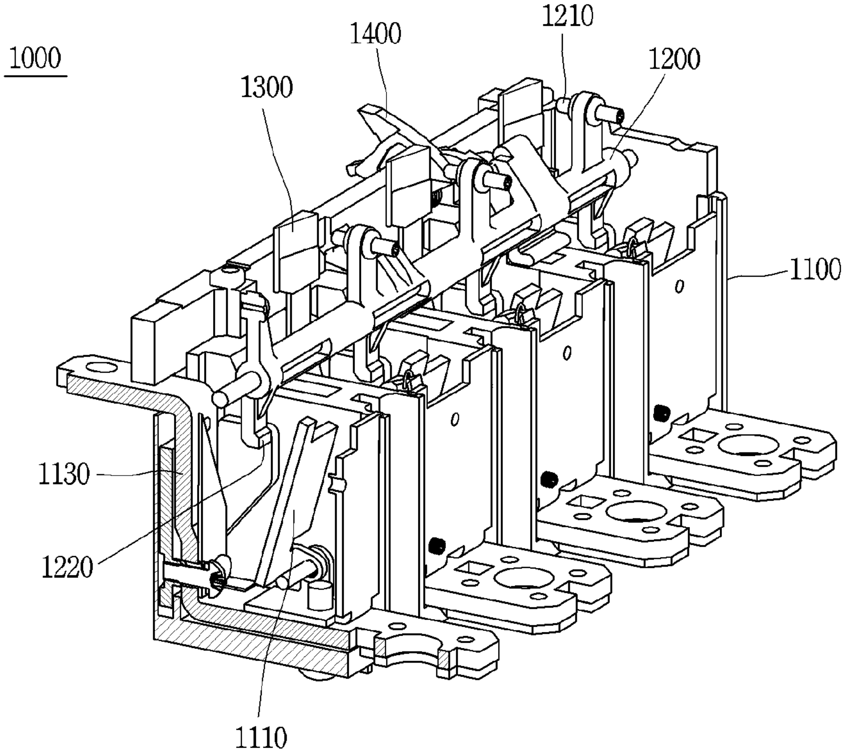
FIG. 1 PRIOR ART
FIG. 1 is a perspective view illustrating a trip device provided in a circuit breaker according to the related art.
Figure 2:
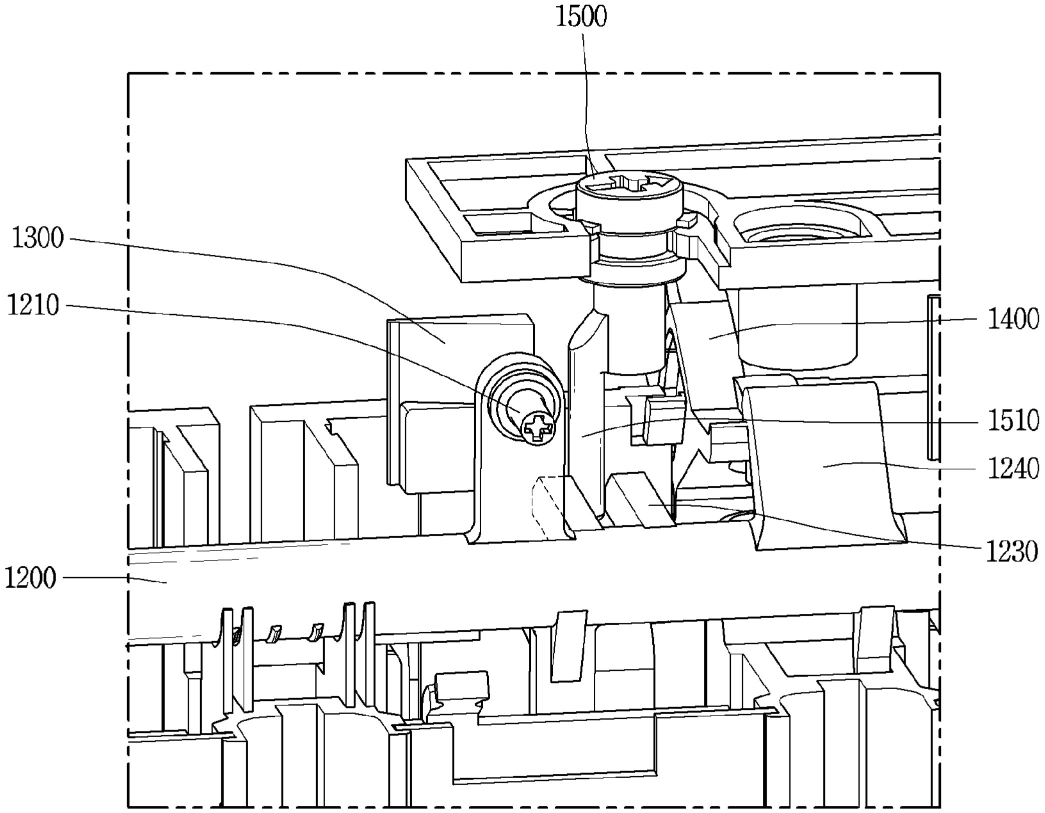
FIG. 2 PRIOR ART
FIG. 2 is a perspective view illustrating a state in which a knob is adjusted in the trip device of FIG. 1.
Figure 3:
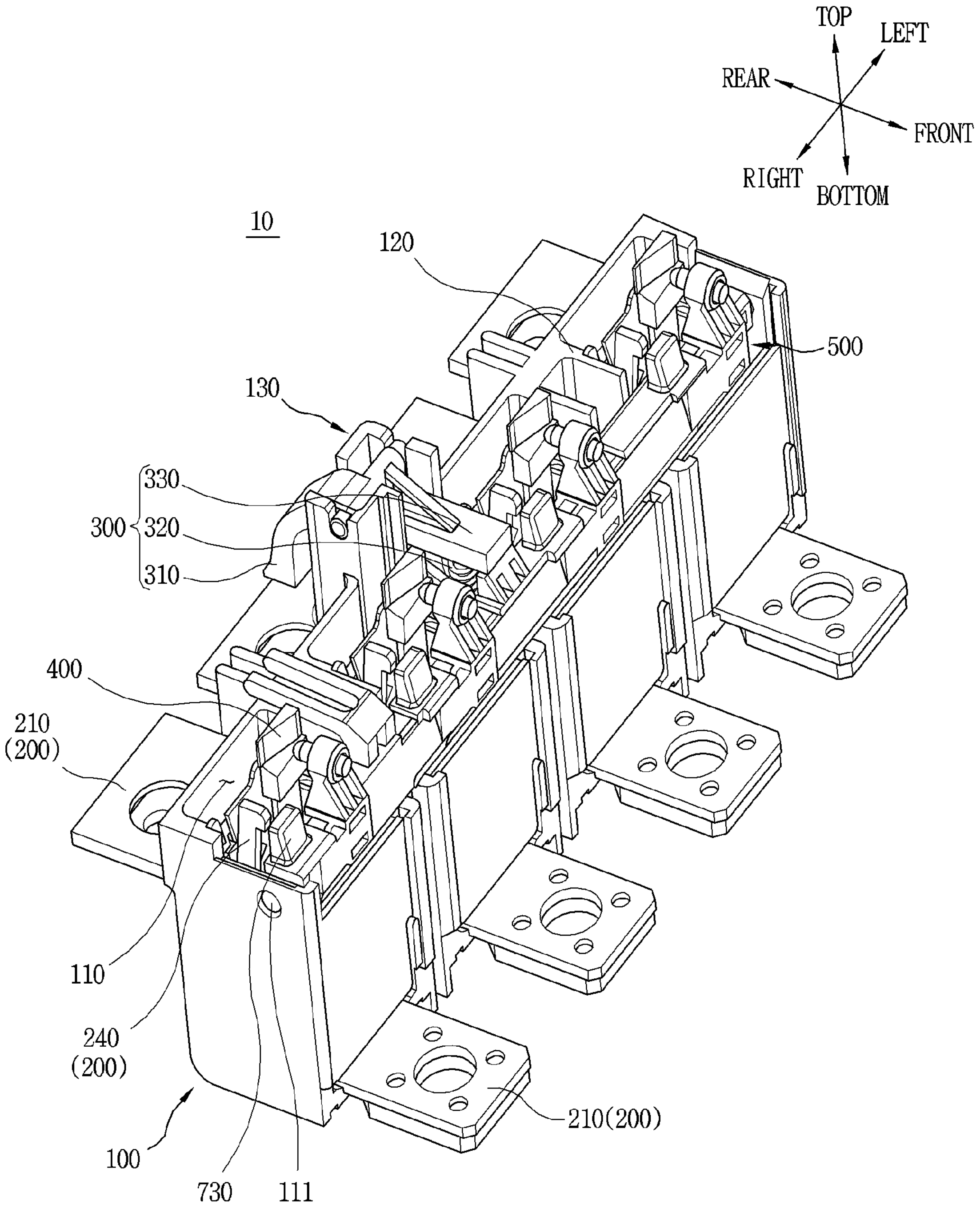
FIG. 3 is a perspective view illustrating a trip device in accordance with one implementation.
Figure 4:
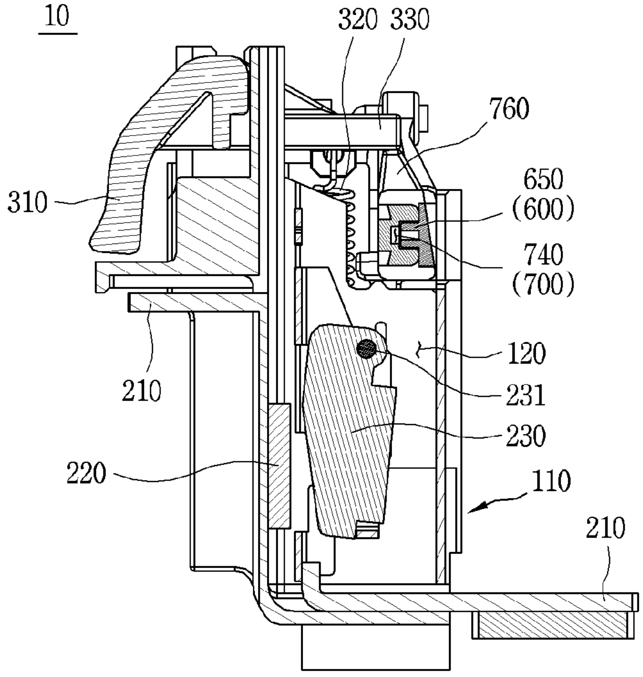
FIG. 4 is a perspective view illustrating a fixed crossbar provided in the trip device of FIG. 3.

Referring to FIGS. 3 and 4, the trip device 10 according to the illustrated example may include a frame 100, a pressing unit 200, a shooter assembly 300, a bimetal 400, and an adjustment crossbar 500.

Hereinafter, each component of the trip device 10 according to the implementation will be described with reference to FIGS. 3 and 4, and the adjustment crossbar 500 will be described as a separate clause.

(1) Description of Frame 100

The frame 100 may define appearance of the trip device 10. Various components for performing a trip operation may be accommodated in the frame 100.

The frame 100 may be formed of an insulating material. This may prevent an arbitrary electrical connection between inside and outside of the trip device 10.

The frame 100 may be formed of a material having pressure resistance and thermal resistance. This can prevent damage due to an arc that is generated when a movable contactor and a fixed contactor are separated from each other as the trip device 10 is driven.

In one implementation, the frame 100 may be formed of a synthetic resin.

The frame 100 may extend in one direction, namely, in an up and down (vertical) direction in the illustrated implementation. Accordingly, the components accommodated in an inner space of the frame 100 may be arranged in the vertical direction.

The frame 100 may include an accommodating portion 110, a partition wall 120, and a shooter coupling portion 130.

The accommodating portion 110 may be a space defined inside the frame 100. Various components for performing a trip operation may be accommodated in the accommodating portion 110.

The accommodating portion 110 may be provided in plurality. The plurality of accommodating portions 110 may be disposed adjacent to each other. In the illustrated implementation, a total of four accommodating portions 110 may be formed to be continuously arranged adjacent to one another in left and right directions.

This may result from that the circuit breaker having the trip device 10 is configured to block currents of three phases, which include R-phase, S-phase, and T-phase or U-phase, V-phase, and W-phase, and N-phase. The number of the accommodating portion 110 may vary.

The partition wall 120 may be disposed between the accommodating portions 110. The partition wall 120 may be located between the accommodating portions 110 adjacent to each other. The partition wall 120 may make the adjacent accommodating portions 110 physically spaced apart from each other. In other words, it can be said that the partition wall 120 divides the single big accommodating portion 110 into a plurality of small accommodating portions 110.

The partition wall 120 can prevent an arbitrary contact or electrical connection between components accommodated in the respective accommodating portions 110.

The shooter assembly 300 may be rotatably coupled to the shooter coupling portion 130. An arc-shaped groove to which the shooter assembly 300 is coupled may be formed in one side of the shooter coupling portion 130, namely, in an upper side in the illustrated implementation.

The shooter coupling portion 130 may extend from one side of the partition wall 120, namely, from an upper end portion in the illustrated implementation. In the illustrated implementation, the shooter coupling portion 130 may be located on the partition wall 120 which is located at the center in the left and right directions, that is, on the partition wall 120 where two accommodating portions 110 are located at each of right and left sides.

The position of the shooter coupling portion 130 may change depending on the position of the shooter assembly 300.

(2) Description of Pressing Unit 200

The pressing unit 200 may generate driving force for performing a trip operation when a fault current or an overcurrent flows through the circuit breaker. The pressing unit 200 may be accommodated in the accommodating portion 110.

The pressing unit 200 may be provided in plurality. As described above, the trip device 10 according to the implementation may include the four accommodating portions 110. Accordingly, four pressing units 200 may also be provided to be accommodated in the plurality of accommodating portions 110, respectively.

The pressing unit 200 may include a heater 210, a magnet 220, an armature 230, and a pressing protrusion 240.

The heater 210 may be a portion through which the trip device 10 is electrically connected to the outside. The heater 210 may protrude by predetermined distances from both sides of the accommodating portion 110, namely, from front and rear sides in the illustrated implementation. The heater 210 may extend between the protruded portions.

In other words, the heater 210 may be continuously formed from the outside of the front side to the outside of the rear side of the frame 100.

One end portion of the heater 210, namely, a rear end portion in the illustrated implementation may be electrically connected to a fixed contactor disposed in the circuit breaker. Accordingly, when a trip operation is not performed, a current passing through the fixed contactor may flow through the heater 210.

Another end portion of the heater 210, namely, a front end portion in the illustrated implementation may be electrically connected to external power source and load. When a trip operation is not performed, a current flowing into the circuit breaker may flow to the external power source or load through the heater 210.

When an overcurrent flows through the heater 210, the heater 210 may generate heat. The heat may cause the bimetal 400 to be curved toward a distance adjustment bar 630 such that the bimetal 400 presses the distance adjustment bar 630. Accordingly, the adjustment crossbar 500 may be moved away from the shooter assembly 300, thereby causing a trip operation.

When a fault current passes through the heater 210, the magnet 220 may generate electromagnetic force for attracting the armature 230, in response to an electromagnetic field formed by the current.

The magnet 220 may be disposed adjacent to the heater 210. The magnet 220 may be magnetized by the electromagnetic field formed by the current flowing through the heater 210.

The magnet 220 may be disposed adjacent to the armature 230. In the illustrated implementation, the magnet 220 may be located between the heater 210 and the armature 230. In addition, the magnet 220 may be located at the front of the heater 210 and simultaneously at the rear of the armature 230.

The magnet 220 may also be disposed to be spaced apart from the armature 230 by a predetermined distance. When the magnet 220 is magnetized, the armature 230 may be moved toward the magnet 220.

The magnet 220 may be implemented as any member that can be magnetized by an electromagnetic field. In one implementation, the magnet 220 may be implemented as a permanent magnet or an electromagnet.

In the illustrated implementation, the magnet 220 may include a body portion formed in parallel with the heater 210, and wing portions extending toward the armature 230 from both sides of the body portion, that is, from left and right end portions. Accordingly, a surface area of the magnet 220 can increase, so that the electromagnetic force generated as the magnet 220 is magnetized can be strengthened.

The armature 230 may be attracted by the electromagnetic force generated by the magnetization of the magnet 220. That is, when the magnet 220 is magnetized, the armature 230 may be moved toward the magnet 220. Accordingly, driving force for performing the trip operation can be generated.

The armature 230 may be disposed adjacent to the magnet 220. In the illustrated implementation, the armature 230 may be disposed at the front side of the magnet 220.

The armature 230 may be accommodated in the accommodating portion 110. The armature 230 may be rotatably coupled to the frame 100. That is, the armature 230 may be rotated centering on an armature rotation shaft 231.

The armature 230 may be in contact with the adjustment crossbar 500. When the armature 230 is rotated toward the magnet 220, the adjustment crossbar 500 may be moved away from the shooter assembly 300.

That is, as the armature 230 is moved, the adjustment crossbar 500 may be moved in a direction opposite to the moving direction of the armature 230. In the illustrated implementation, the armature 230 may be moved toward the rear side, and accordingly the adjustment crossbar 500 may be moved toward the front side.

This can release the coupling between the adjustment crossbar 500 and the shooter assembly 300, so that the shooter assembly 300 can perform a trip operation. A detailed description thereof will be described later.

The pressing protrusion 240 may extend from one end portion of the armature 230. In the illustrated implementation, the pressing protrusion 240 may extend toward the adjustment crossbar 500 that is located above the armature 230. One end portion of the pressing protrusion 240 may be in contact with one surface of a pushed protrusion 730 of the adjustment crossbar 500, namely, a rear surface in the illustrated implementation.

The one end portion of the pressing protrusion 240 may be located above the armature rotation shaft 231. Accordingly, the pressing protrusion 240 may be rotated in a direction opposite to the rotating direction of the armature 230.

The pressing protrusion 240 may be rotated integrally with the armature 230. That is, when the armature 230 is rotated toward the magnet 220, the pressing protrusion 240 may be rotated in the opposite direction, that is, away from the magnet 220. In other words, the pressing protrusion 240 may be rotated toward the adjustment crossbar 500.

When the pressing protrusion 240 is rotated toward the adjustment crossbar 500, the pressing protrusion 240 may be brought into contact with the pushed protrusion 730. When the rotary motion of the pressing protrusion 240 continues, the pressing protrusion 240 may press the pushed protrusion 730. Accordingly, the adjustment crossbar 500 can be moved away from the shooter assembly 300, thereby enabling a trip operation.

(3) Description of Shooter Assembly 300

The shooter assembly 300 may be rotated when an overcurrent or a fault current flows. An opening/closing mechanism (not illustrated) may be regulated by the rotation of the shooter assembly 300 so that the circuit breaker can block a current.

In a situation in which a trip operation is not required, that is, in a situation in which a normal current flows along the circuit breaker, the shooter assembly 300 may be maintained in the contact state with the adjustment crossbar 500. Accordingly, the movement of the shooter assembly 300 can be restricted.

In a situation in which a trip operation should be performed, that is, in a situation in which an overcurrent or a fault current flows along the circuit breaker, the shooter assembly 300 may be spaced apart from the adjustment crossbar 500. Accordingly, the shooter assembly 300 can be rotated to regulate the opening/closing mechanism (not illustrated).

The shooter assembly 300 may be rotatably coupled to the frame 100. Specifically, a shooter body portion 310 may be rotatably coupled to the shooter coupling portion 130.

The shooter assembly 300 may be supported by the adjustment crossbar 500. Specifically, a lower side of a crossbar contact portion 330 may be supported by a shooter support portion 760. The support state may be stably maintained by an elastic member 320 that pulls the shooter assembly 300 downward.

The shooter assembly 300 may be connected to the opening/closing mechanism (not illustrated). When the shooter assembly 300 is rotated, the opening/closing mechanism (not illustrated) may also be rotated.

In the illustrated implementation, the shooter assembly 300 may be located in a central portion of the frame 100 in the left and right directions. That is, the two accommodating portions 110 may be located at each of the left and right sides of the shooter assembly 300. The position of the shooter assembly 300 may change depending on the position of the shooter coupling portion 130.

The shooter assembly 300 may include a shooter body portion 310, an elastic member 320, and a crossbar contact portion 330.

The shooter body portion 310 may define the body of the shooter assembly 300. The shooter body portion 310 may include a first portion extending from a lower end portion to be curved upward, and a second portion extending from an end of the first portion toward the front.

In other words, the shooter body portion 310 may include a first portion extending from the shooter coupling portion 130 to be curved toward the heater 210, and a second portion extending from the shooter coupling portion 130 toward the adjustment crossbar 500. The second portion may be defined as the crossbar contact portion 330.

The shooter body portion 310 may be rotatably coupled to the shooter coupling portion 130.

The elastic member 320 may apply elastic force to the shooter assembly 300. The contact state between the crossbar contact portion and the shooter support portion 760 can be maintained by the elastic force.

The elastic member 320 may be located below the crossbar contact portion 330. One side, that is, an upper end of the elastic member 320 facing the crossbar contact portion 330 may be connected to the crossbar contact portion 330. Another side, that is, a lower end of the elastic member 320 located in a direction away from the crossbar contact portion 330 may be connected to an arbitrary member inside the accommodating portion 110.

The elastic member 320 may be tensioned between the crossbar contact portion 330 and the arbitrary member. That is, the elastic member 320 may be located below the crossbar contact portion 330 in a state in which predetermined restoring force is stored. In other words, the elastic member 320 may apply elastic force for pulling the crossbar contact portion 330 downward.

Accordingly, the crossbar contact portion 330 can receive the elastic force applied downward in a state in which it is seated on the shooter support portion 760. This can prevent the crossbar contact portion 330 from being arbitrarily separated from the shooter support portion 760.

In addition, when the pressing protrusion 240 presses the pushed protrusion 730, the adjustment crossbar 500 may be moved away from the shooter assembly 300, namely, toward the front side in the illustrated implementation.

Therefore, the shooter support portion 760 located beneath the crossbar contact portion 330 can also be moved toward the front side, thereby releasing the contact state between the crossbar contact portion 330 and the shooter support portion 760.

In this case, the crossbar contact portion 330 may be moved downward by the restoring force of the elastic member 320. In the illustrated implementation, it will be understood that the crossbar contact portion 330 is rotated clockwise centering on the shooter coupling portion 130.

The elastic member 320 may be arbitrarily configured to be capable of storing restoring force by deformation and applying the stored restoring force to another member. In one implementation, the elastic member 320 may be configured as a coil spring.

The crossbar contact portion 330 may be a portion where the shooter assembly 300 is in contact with the adjustment crossbar 500.

When the trip operation is not performed, the lower side of the crossbar contact portion 330 may be seated on the shooter support portion 760. When the trip operation is performed, the crossbar contact portion 330 may be rotated clockwise by the restoring force of the elastic member 320, so that an end portion thereof faces downward.

The crossbar contact portion 330 may extend from a portion where the shooter assembly 300 comes in contact with the shooter coupling portion 130 toward one side, namely, toward the front side in the illustrated implementation by a predetermined distance.

The crossbar contact portion 330 may preferably extend to such an extent that it is seated on the shooter support portion 760 when the trip operation is not performed but does not come in contact with the shooter support portion 760 when the trip operation is performed.

(4) Description of Bimetal 400

The bimetal 400 may be curved toward the distance adjustment bar 630 by heat generated in the heater 210 as an overcurrent flows. The bimetal 400 may press the distance adjustment bar 630. Accordingly, the adjustment crossbar 500 may be moved away from the bimetal 400, namely, toward the front side in the illustrated implementation.

Responsive to the movement, the crossbar contact portion 330 and the shooter support portion 760 may be spaced apart from each other, thereby rotating the shooter body portion 310. This can result in performing a trip operation.

The bimetal 400 may be formed of a plurality of metal materials having different thermal expansion coefficients. Among the metal materials constituting the bimetal 400, a thermal expansion coefficient of a metal material located in a direction away from the distance adjustment bar 630 may be greater than a thermal expansion coefficient of a metal material located adjacent to the distance adjustment bar 630.

Accordingly, when heat is transferred to the bimetal 400, the bimetal 400 may be curved toward the distance adjustment bar 630.

The bimetal 400 may be inclined in the extending direction of the adjustment crossbar 500, namely, in the left and right directions in the illustrated implementation. That is, the shortest distance between the bimetal 400 and the distance adjustment bar 630 may be different along the left and right directions of the bimetal 400.

In the illustrated implementation, the shortest distance between the bimetal 400 and the distance adjustment bar 630 may decrease from left to right.

Accordingly, the shortest distance between the bimetal 400 and the distance adjustment bar 630 can be adjusted by moving the distance adjustment bar 630 in the left and right directions. This can adjust magnitude of a reference current for the trip device 10 to perform a trip operation.

The bimetal 400 may be provided in plurality. The plurality of bimetals 400 may be spaced apart from one another by predetermined distances and accommodated in the plurality of accommodation portions 110, respectively. In the illustrated implementation, four bimetal 400 may be provided to be accommodated in the respective accommodating portions 110.

The bimetal 400 may be spaced apart from one end portion of the distance adjustment bar 630 facing the bimetal 400, namely, a rear end portion in the illustrated implementation by a predetermined distance.

The bimetal 400 may be disposed adjacent to the heater 210. Heat generated by the heater 210 may be transferred to the bimetal 400. In one implementation, the bimetal 400 may extend in the vertical direction.

3. Description of Adjustment Crossbar 500 According to Implementation

Referring back to FIGS. 3 and 4, the trip device 10 according to the implementation may include the adjustment crossbar 500.

The adjustment crossbar 500 may be moved in one direction, namely, in front and rear directions in the illustrated implementation, to be brought into contact with or spaced apart from the shooter assembly 300. Accordingly, the trip device 10 can be driven to open or close a circuit.

The adjustment crossbar 500 may be rotatably coupled to the frame 100. When the pressing protrusion 240 presses the pushed protrusion 730, the adjustment crossbar 500 may be rotated away from the shooter assembly 300, namely, clockwise in the illustrated implementation.

Also, the adjustment crossbar 500 may be moved in another direction, namely, in the left and right directions in the illustrated implementation. Accordingly, the shortest distance between the bimetal 400 and the distance adjustment bar 630 can be adjusted, thereby adjusting magnitude of a current to be blocked.

Hereinafter, the adjustment crossbar 500 according to the implementation will be described in detail, with reference to FIGS. 5 to 8.

In the illustrated implementation, the adjustment crossbar 500 may include a movable crossbar 600 and a fixed crossbar 700. The adjustment crossbar 500 may be configured by the combination of the movable crossbar 600 and the fixed crossbar 700. In the illustrated implementation, the movable crossbar 600 may be located at the front of the fixed crossbar 700.

Accordingly, it will be understood that each configuration of the movable crossbar 600 and the fixed crossbar 700 to be described below is included in the adjustment crossbar 500.

(1) Description of Movable Crossbar 600

Figure 5:
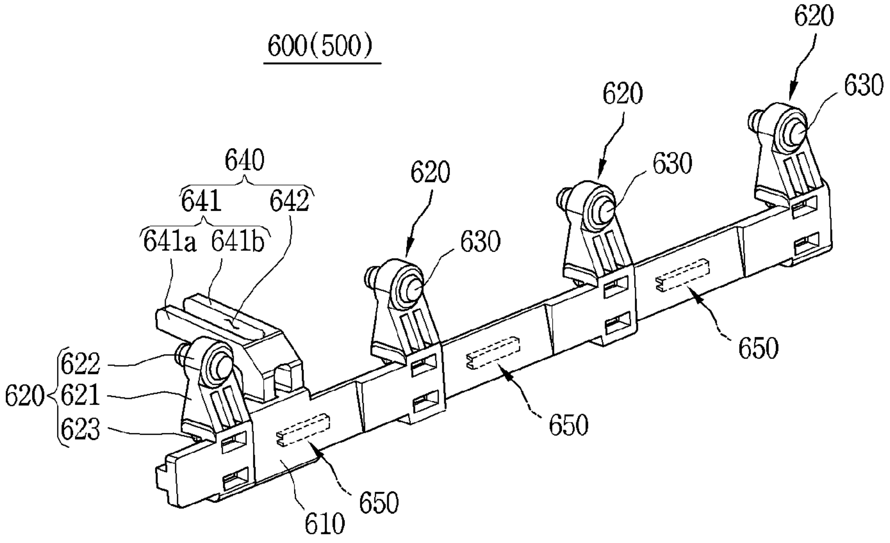
FIG. 5 is a perspective view illustrating a movable crossbar provided in the trip device of FIG. 3.

Referring to FIG. 5, the movable crossbar 600 included in the adjustment crossbar 500 according to the implementation is illustrated.

The movable crossbar 600 may be slidably coupled to the fixed core 700. That is, the movable crossbar 600 may slide relative to the fixed crossbar 700 in the longitudinal direction, namely, in the left and right directions in the illustrated implementation.

The movable crossbar 600 may move integrally with the fixed crossbar 700. That is, when the bimetal 400 is curved to press the distance adjustment bar 630, the movable crossbar 600 may move together with the fixed crossbar 700.

At this time, it will be understood that the movable crossbar 600 is rotated clockwise to be away from the shooter assembly 300, namely, toward the front side in the illustrated embodiment.

The movable crossbar 600 may extend in one direction, namely, in the left and right directions in the illustrated implementation. An extension length of the movable crossbar 600 may be determined to be shorter than or equal to an extension length of the frame 100 in the left and right directions. Accordingly, the movable crossbar 600 may slide by a predetermined distance in a state of being coupled to the frame 100.

The movable crossbar 600 may include a movable body portion 610, a distance adjustment bar holder 620, a distance adjustment bar 630, a knob coupling portion 640, and an insertion protrusion 650.

The movable body portion 610 may define the body of the movable crossbar 600. The movable body portion 610 may extend in one direction, namely, in the left and right directions in the illustrated implementation.

The movable body portion 610 may be formed of a non-conductive material. In one implementation, the movable body portion 610 may be formed of a synthetic resin. This can prevent an arbitrary electrical connection between the movable body portion 610 and the pressing unit 200.

The insertion protrusion 650 may protrude by a predetermined length from one side of the movable body portion 610 facing the fixed crossbar 700, namely, from the rear side in the illustrated implementation.

The distance adjustment bar holder 620 may protrude by a predetermined length from another side of the movable body portion 610 in a direction away from the pressing unit 200, namely, from an upper side in the illustrated implementation.

The distance adjustment bar 630 may be coupled through the distance adjustment bar holder 620. The distance adjustment bar 630 may be movable by a predetermined distance along a coupling direction, namely, along the front and rear directions in the illustrated implementation, in an inserted state in the distance adjustment bar holder 620. This can adjust the shortest distance between the distance adjustment bar 630 and the bimetal 400.

The distance adjustment bar holder 620 may be provided in plurality. The plurality of distance adjustment bar holders 620 may be disposed to be spaced apart from one another by predetermined distances. In the illustrated implementation, four distance adjustment bar holders 620 may be provided. The number of the distance adjustment bar holder 620 may be determined depending on the number of the accommodating portion 110 or the pressuring unit 200.

The distance adjustment bar holder 620 may be located on one side of the movable body portion 610 in the direction away from the pressing unit 200, namely, on an upper side in the illustrated implementation.

The distance adjustment bar holder 620 may include an extension portion 621, a bar insertion portion 622, and a locking protrusion 623.

The extension portion 621 may define the body of the distance adjustment bar holder 620. The extension portion 621 may extend by a predetermined length from the movable body portion 610. One side of the extension portion 621 facing the movable body portion 610, namely, a lower end portion in the illustrated implementation, may be coupled to the movable body portion 610.

The bar insertion portion 622 may be formed on another side of the extension portion 621 in the direction away from the movable body portion 610, namely, on an upper end portion in the illustrated implementation.

The distance adjustment bar 630 may be inserted through the bar insertion portion 622. The bar insertion portion 622 may include a hollow portion formed through an inside thereof. The distance adjustment bar 630 may be inserted through the hollow portion.

In the illustrated implementation, the distance adjustment bar 630 may have a cylindrical shape with a circular cross section. Accordingly, the hollow portion may also be formed to have a circular cross section corresponding to the shape.

An inner diameter of the hollow portion may be smaller than or equal to an outer diameter of the distance adjustment bar 630. Accordingly, when the distance adjustment bar 630 is inserted through the hollow portion, the distance adjustment bar 630 may not arbitrarily move toward or away from the bimetal 400.

The locking protrusion 623 may be inserted into a holder insertion portion 711. The locking protrusion 623 may be moved by a predetermined distance in the left and right directions, in response to the movement of the movable body portion 610, in a state of being inserted into the holder insertion portion 711.

The locking protrusion 623 may be formed on one side of the extension portion 621 facing the movable body portion 610, namely, on a lower end portion in the illustrated implementation. The locking protrusion 623 may protrude by a predetermined length. A protrusion length of the locking protrusion 623 may preferably be shorter than or equal to a length by which the holder insertion portion 711 is recessed.

The locking protrusion 623 may have a predetermined thickness in the extending direction of the movable body portion 610, that is, in the left and right directions. The thickness of the locking protrusion 623 may preferably be less than or equal to a length of the holder insertion portion 711 in the extending direction, that is, in the left and right directions.

Accordingly, when the locking protrusion 623 is inserted into the holder insertion portion 711, a sliding distance of the movable crossbar 600 can be limited. That is, the movable crossbar 600 can be slidable between a position where a left surface of the locking protrusion 623 is brought into contact with a surface surrounding the holder inserting portion 711 at the left and a position where a right surface of the locking protrusion 623 is brought into contact with a surface surrounding the holder insertion portion 711 at the right.

The distance adjustment bar 630 may be pressed by the bimetal 400 in a situation where a trip operation is required. The distance adjustment bar 630 may extend toward the bimetal 400.

The distance adjustment bar 630 may be coupled to the distance adjustment bar holder 620. Specifically, the distance adjustment bar 630 may be inserted through the hollow portion formed through the inside of the bar insertion portion 622.

In the illustrated implementation, the distance adjustment bar 630 may be formed in a cylindrical shape having a circular cross section and extending in the front and rear directions.

One end portion of the distance adjustment bar 630 facing the bimetal 400 may be rounded. That is, the one end portion of the distance adjustment bar 630 may be convex toward the bimetal 400. Accordingly, regardless of a curved angle of the bimetal 400, the bimetal 400 can stably press the distance adjustment bar 630.

A distance between the one end portion of the distance adjustment bar 630 and the bimetal 400, that is, the shortest distance between the distance adjustment bar 630 and the bimetal 400 may vary. This may be achieved by the sliding movement of the movable crossbar 600. A detailed description thereof will be described later.

A knob (not illustrated) may be inserted into the knob coupling portion 640. The knob (not illustrated) may be rotatably coupled to the frame 100. When the knob (not illustrated) is rotated, the knob coupling portion 640 and the movable body portion 610 connected thereto may be slidable to left or right.

The knob coupling portion 640 may be formed on one side of the movable body portion 610 in the direction away from the pressing unit 200, namely, on an upper side in the illustrated implementation. In the illustrated implementation, the knob coupling portion 640 may be located adjacent to the distance adjustment bar holder 620 located at the rightmost side. The position of the knob coupling portion 640 may change depending on the position of the knob (not illustrated).

The knob coupling portion 640 may include an extension portion 641 and a knob insertion portion 642.

The extension portion 641 may extend by a predetermined length toward the rear side. The extension portion 641 may include a first extension portion 641*a* and a second extension portion 641*b* spaced apart from each other by a predetermined distance. The predetermined distance may be determined according to a diameter of the knob (not illustrated) inserted into the knob insertion portion 642.

The knob insertion portion 642 may be a space into which the knob (not illustrated) is inserted. The knob insertion portion 642 may be defined by a space formed as the first extension portion 641*a* and the second extension portion 641*b* are spaced apart from each other.

The insertion protrusion 650 may be a portion by which the movable crossbar 600 is coupled to the fixed crossbar 700. The insertion protrusion 650 may be inserted into an insertion space 740.

The insertion protrusion 650 may protrude by a predetermined length from one side of the movable body portion facing the fixed crossbar 700, namely, from the rear side in the illustrated implementation. A protrusion length of the insertion protrusion 650 may preferably be determined to be shorter than or equal to a recessed length of the insertion space 740.

The insertion protrusion 650 may be provided in plurality. In the illustrated implementation, three insertion protrusions 650 may be provided. The plurality of insertion protrusions 650 may be located to be spaced apart from one another by predetermined distances. In the illustrated implementation, each insertion protrusion 650 may be located between the adjacent distance adjustment bar holders 620.

The insertion protrusion 650 may be formed to have a predetermined thickness in a direction in which the distance adjustment bar holder 620 extends, namely, in the vertical direction in the illustrated implementation.

A groove may be provided inside the insertion protrusion 650 to be recessed into one end portion facing the fixed crossbar 700 by a predetermined distance. The groove may define a space in which upper and lower surfaces of the insertion protrusion 650 can face each other. Accordingly, the insertion protrusion 650 may be fitted into the insertion space 740.

The insertion protrusion 650 may be moved in the extending direction of the movable body portion 610, namely, in the left and right directions in the illustrated implementation, in the inserted state in the insertion space 740.

(2) Description of Fixed Crossbar 700

Figure 6:
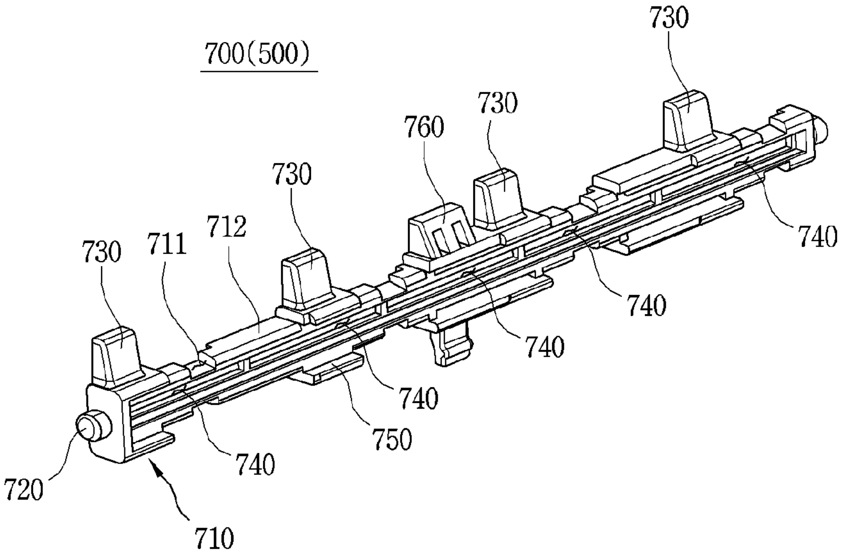
FIG. 6 is a perspective view illustrating a process in which the fixed crossbar of FIG. 4 and the movable crossbar of FIG. 5 are coupled to each other.

Referring to FIG. 6, the fixed crossbar 700 included in the adjustment crossbar 500 according to the implementation is illustrated.

The movable crossbar 600 may be slidably coupled to the fixed crossbar 700.

The fixed crossbar 700 may move integrally with the movable crossbar 600. That is, when the bimetal 400 is curved to press the distance adjustment bar 630, the fixed crossbar 700 may move together with the movable crossbar 600.

At this time, it will be understood that the fixed crossbar 700 is rotated clockwise to be away from the shooter assembly 300, namely, toward the front side in the illustrated embodiment.

The fixed crossbar 700 may extend in one direction, namely, in the left and right directions in the illustrated implementation. That is, the fixed crossbar 700 may extend in the same direction as the movable crossbar 600.

An extension length of the fixed crossbar 700 may be determined to be equal to a length of the frame 100 in the left and right directions. Accordingly, the fixed crossbar 700 coupled to the frame 100 may not move in the left and right directions.

The fixed crossbar 700 may be rotatably coupled to the frame 100. Specifically, a rotation shaft 720 may be rotatably inserted into a rotation shaft insertion hole 111. Accordingly, the fixed crossbar 700 can rotate in a direction away from the shooter assembly 300, that is, in a clockwise direction.

The fixed crossbar 700 may include a fixed body portion 710, a rotation shaft 720, a pushed protrusion 730, an insertion space 740, a support protrusion 750, and a shooter support portion 760.

The fixed body portion 710 may define the body of the fixed crossbar 700. The fixed body portion 710 may extend in one direction, namely, in the left and right directions in the illustrated implementation. It will be understood that an extending direction of the fixed body portion 710 is the same as the extending direction of the movable body portion 610.

The fixed body portion 710 may be formed of a non-conductive material. In one implementation, the fixed body portion 710 may be formed of a synthetic resin. This can prevent an arbitrary electrical connection between the fixed body portion 710 and the pressing unit 200.

The rotation shaft 720 may protrude by predetermined lengths from both end portions in the extending direction of the fixed body portion 710, namely, both end portions in the left and right directions in the illustrated implementation.

The pushed protrusion 730 and the shooter support portion 760 may protrude by predetermined lengths from one side of the fixed body portion 710 in a direction away from the pressing unit 200, namely, upward in the illustrated implementation.

The insertion space 740 may be formed by being recessed into another side of the fixed body portion 710 facing the movable crossbar 600, namely, into a front side in the illustrated implementation.

The support protrusion 750 may protrude by a predetermined length from another side of the fixed body portion 710 facing the pressing unit 200, namely, from a lower side in the illustrated implementation.

The fixed body portion 710 may include a holder insertion portion 711 and a ridge portion 712.

The holder insertion portion 711 may be recessed by a predetermined length into one side of the fixed body portion 710 in the direction away from the pressing unit 200, namely, into an upper side in the illustrated implementation. A recessed length of the holder insertion portion 711 may be longer than or equal to the protrusion length of the locking protrusion 623.

The holder insertion portion 711 may be formed through the fixed body portion 710 in a direction in which the fixed crossbar 700 and the movable crossbar 600 are coupled to each other, namely, in the front and rear directions in the illustrated implementation.

The holder insertion portion 711 may extend by a predetermined length in the direction in which the fixing body portion 710 extends, that is, in the left and right directions in the illustrated implementation. Left and right sides of the holder insertion portion 711 may be surrounded by the ridge portions 712.

Accordingly, the locking protrusion 623 can be moved by a predetermined distance in the left or right direction while being inserted into the holder insertion portion 711.

The holder insertion portion 711 may be provided in plurality. The plurality of holder insertion portions 711 may be located to be spaced apart from one another in the extending direction of the fixed body portion 710, that is, in the left and right directions. The number and position of the holder insertion portion 711 may be determined depending on the position and number of the locking protrusion 623.

The holder insertion portion 711 may be located between the ridge portions 712.

The ridge portions 712 may define one side of the fixed body portion 710 in the direction away from the pressing unit 200, that is, an upper surface in the illustrated implementation.

The ridge portions 712 may surround both end portions in a longitudinal direction of the holder insertion portion 711. That is, in the illustrated implementation, the ridge portions 712 may surround the left and right end portions of the holder insertion portion 711.

Accordingly, a movement distance in the left and right directions of the locking protrusion 623 inserted into the holder insertion portion 711 may be limited to a distance at which the locking protrusion is in contact with the ridge portion 712.

The ridge portion 712 may be divided into two parts that surround the holder insertion portion 711 at the left and right sides, respectively.

The ridge portion 712 may be provided in plurality. The plurality of ridge portions 712 may be spaced apart from one another by predetermined distances in the extending direction of the fixed body portion 710. The plurality of ridge portions 712 may be located to define the left and right sides of each holder insertion portion 711, respectively.

The rotation shaft 720 may be a portion by which the fixed crossbar 700 is rotatably coupled to the frame 100. The rotation shaft 720 may be rotatably inserted into the rotation shaft insertion hole 111 formed through each end surface of the frame 100 in the longitudinal direction.

The rotating shaft 720 may be located at each end portion of the fixed body portion 710 in the longitudinal direction, that is, in the left and right directions in the illustrated implementation. The rotation shaft 720 may protrude from each end portion of the fixed body portion 710 by a predetermined length.

By the rotation shaft 720, the fixed crossbar 700 and the adjustment crossbar 500 including the fixed crossbar 700 can be rotated relative to the frame 100.

The pushed protrusion 730 may be a portion pressed by the pressing protrusion 240. When the pushed protrusion 730 is pressed, the fixed crossbar 700 and the adjustment crossbar 500 may be rotated away from the shooter assembly 300.

The pushed protrusion 730 may be located on one side of the fixed body portion 710 in the direction away from the pressing unit 200, namely, on the upper side in the illustrated implementation. The pushed protrusion 730 may protrude from the upper side of the fixed body portion 710 by a predetermined length.

The pushed protrusion 730 may be provided in plurality. The plurality of pushed protrusions 730 may be spaced apart from one another by predetermined distances along the extending direction of the fixed body portion 710. In the illustrated implementation, four pushed protrusions 730 may be provided to be spaced apart from one another by predetermined distances in the left and right directions. The holder insertion portion 711 and the ridge portion 712 may be located between pushed protrusions 730.

It will be understood that the number and position of the pushed protrusion 730 is determined depending on the number and position of the pressing protrusion 240.

The insertion space 740 may be a space into which the locking protrusion 623 is inserted. The insertion space 740 may be recessed by a predetermined distance into one side of the fixed body portion 710 facing the movable crossbar 600, namely, into a front surface in the illustrated implementation.

The insertion space 740 may extend by a predetermined length in the extending direction of the fixed body portion 710, that is, in the left and right directions in the illustrated implementation. Due to the shape of the insertion space 740, the locking protrusion 623 inserted into the insertion space 740 may be moved in the left and right directions.

The insertion space 740 may be provided in plurality. The plurality of insertion spaces 740 may be partitioned by partition walls. The partition walls can reinforce rigidity of the fixed body portion 710.

Although not illustrated, the partition wall may not be provided. That is, the insertion space 740 may continuously extend along the extending direction of the fixed body portion 710.

The insertion space 740 may have a predetermined width in a heightwise direction, namely, in the vertical direction in the illustrated implementation. The width may be the same as the thickness of the insertion protrusion 650 in the vertical direction.

As described above, the insertion protrusion 650 may be inserted into the insertion space 740 by being deformed to some extent due to the groove formed therein. In the implementation, the insertion protrusion 650 inserted into the insertion space 740 may not be arbitrarily separated.

The support protrusion 750 may support the movable body portion 610 of the movable crossbar 600 from a lower side. The support protrusion 750 may protrude from the lower side of the fixed body portion 710 toward the movable crossbar 600 by a predetermined length.

The support protrusion 750 may be provided in plurality. The plurality of support protrusions 750 may be spaced apart from one another by predetermined distances in the extending direction of the fixed body portion 710, that is, in the left and right directions in the illustrated implementation.

In the illustrated implementation, the support protrusions 750 may be located below the pushed protrusions 730, respectively. With the arrangement, when the pushed protrusion 730 is pressed in a direction toward the movable crossbar 600, the support protrusion 750 may support the lower side of the movable body portion 610.

Accordingly, when the pushed protrusion 730 is pushed by the pressing protrusion 240, the adjustment crossbar 500 may be rotated centering on the rotation shaft 720. As described above, the rotating direction may be the direction away from the shooter assembly 300, that is, the clockwise direction in the illustrated implementation.

The shooter support portion 760 may support the shooter assembly 300. Specifically, the crossbar contact portion 330 of the shooter assembly 300 may be seated on the shooter support portion 760. The shooter support portion 760 and the crossbar contact portion 330 may be in surface-contact with each other.

As described above, the crossbar contact portion 330 may receive elastic force in a direction toward the pressing unit 200, namely, downward in the illustrated implementation by the elastic member 320. Therefore, the crossbar contact portion 330 can be stably maintained in the seated state on the shooter support portion 760.

The shooter support portion 760 may be located on one side of the fixed body portion 710 in the direction away from the pressing unit 200, namely, on the upper side in the illustrated implementation. The shooter support portion 760 may protrude from the upper side of the fixed body portion 710 by a predetermined length.

In one implementation, the shooter support portion 760 may protrude as long as the seated crossbar contact portion 330 can be maintained horizontally.

In the illustrated implementation, the shooter support portion 760 may be disposed such that two pushed protrusions 730 and another two pushed protrusions 730 are located in the longitudinal direction of the fixed body portion 710, that is, at the left and right sides, respectively. That is, the shooter support portion 760 may be located in the middle of the plurality of pushed protrusions 730.

The position of the shooter support portion 760 may be determined to correspond to the position of the shooter assembly 300.

The shooter support portion 760 may not move in the longitudinal direction, namely, in the left and right directions in the illustrated implementation. Therefore, the crossbar contact portion 330 can be stably maintained in the contact state with the shooter support portion 760.

Accordingly, the bimetal 400 may not be affected by the contact between the shooter support portion 760 and the crossbar contact portion 330.

(3) Description of Coupling Process of Adjustment Crossbar 500

Figure 7:
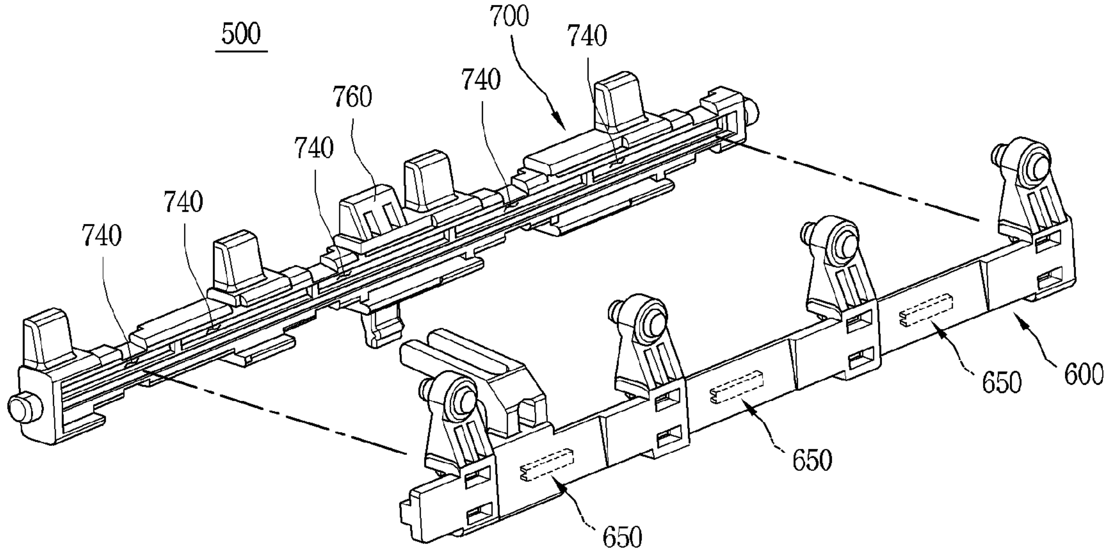
FIG. 7 is a perspective view illustrating an adjustment crossbar formed by the process of FIG. 6.
Figure 8:
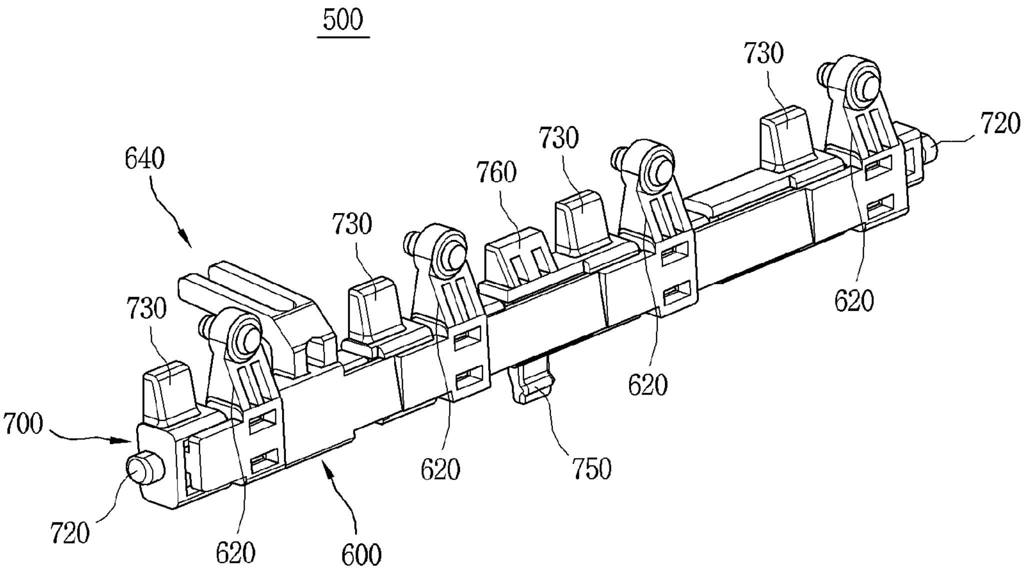
FIG. 8 is a cross-sectional view illustrating the trip device to which the adjustment crossbar of FIG. 7 is coupled.

Referring to FIGS. 7 and 8, a process of configuring the adjustment crossbar 500 according to an implementation is illustrated.

As described above, the adjustment crossbar 500 may be configured by the combination of the movable crossbar 600 and the fixed crossbar 700.

The movable crossbar 600 may be disposed such that a distance from the shooter assembly 300 is longer than a distance between the fixed crossbar 700 and the shooter assembly 300. That is, the movable crossbar 600 may be disposed to be farther away from the shooter assembly 300 than the fixed crossbar 700.

In the illustrated implementation, the movable crossbar 600 may be disposed at the front of the fixed crossbar 700.

The fixed crossbar 700 may be disposed at the rear of the movable crossbar 600. That is, the fixed crossbar 700 may be disposed between the shooter assembly 300 and the movable crossbar 600.

The insertion protrusion 650 of the movable crossbar 600 may be inserted into the insertion space 740 of the fixed crossbar 700. Each of the insertion protrusion 650 and the insertion space 740 may be provided in plurality. The plurality of insertion protrusions 650 may be respectively inserted into the plurality of insertion spaces 740.

In one implementation, the thickness of the insertion protrusion 650 may be greater than or equal to the height of the insertion space 740. In addition, the groove may be formed inside the insertion protrusion 650 such that upper and lower surfaces of the insertion protrusion 650 surrounding the groove can move toward each other.

In the implementation, the insertion protrusion 650 may be fitted into the insertion space 740. Accordingly, the movable crossbar 600 and the fixed crossbar 700 can be stably coupled to each other.

In this case, the insertion space 740 may extend in the longitudinal direction of the fixed crossbar 700. Accordingly, the insertion protrusion 650 can be moved in the left and right directions in the inserted state in the insertion space 740.

The locking protrusion 623 of the movable crossbar 600 may be inserted into the holder insertion portion 711 of the fixed crossbar 700. The holder insertion portion 711 may extend in the longitudinal direction of the fixed crossbar 700. Accordingly, the locking protrusion 623 can also be moved in the left and right directions in the inserted state in the holder insertion portion 711.

By the coupling, the movable crossbar 600 can be slidably coupled to the fixed crossbar 700. As described above, the sliding movement may be performed in the direction in which the adjustment crossbar 500 extends, that is, in the left and right directions in the illustrated implementation.

The distance adjustment bar holder 620 formed on the movable crossbar 600 may extend toward the fixed crossbar 700. That is, when the movable crossbar 600 is coupled to the fixed crossbar 700, the distance adjustment bar holder 620 may extend toward the shooter assembly 300 via the fixed body portion 710.

Accordingly, the distance between the distance adjustment bar 630 coupled to the distance adjustment bar holder 620 and the bimetal 400 may be formed to be sufficient to perform a trip operation.

When the adjustment crossbar 500 is formed, the pushed protrusion 730 and the distance adjustment bar holder 620 may be alternately disposed in the longitudinal direction of the adjustment crossbar 500, that is, in the left and right directions.

In addition, the shooter support portion 760 may be located at a central portion in the left and right directions of the adjustment crossbar 500. As described above, the position may correspond to the position of the shooter assembly 300.

4. Description of Process of Operating Trip Device 10 According to Implementation Hereinafter, a detailed description will be given of a process of operating the trip device according to an implementation, with reference to FIGS. 9 to 12.

In the following description, the term "shortest distance" between the bimetal 400 and the distance adjustment bar 630 refers to a distance between the bimetal 400 and one end portion of the distance adjustment bar 630 facing the bimetal 400.

Figure 9:
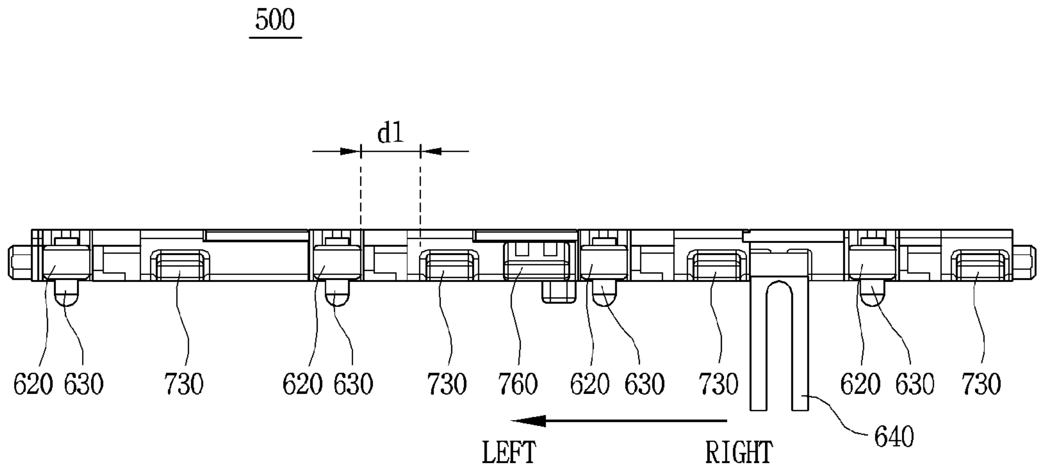
FIG. 9 is a planar view illustrating a state in which the movable crossbar provided in the adjustment crossbar of FIG. 7 is moved to one side.
Figure 10:
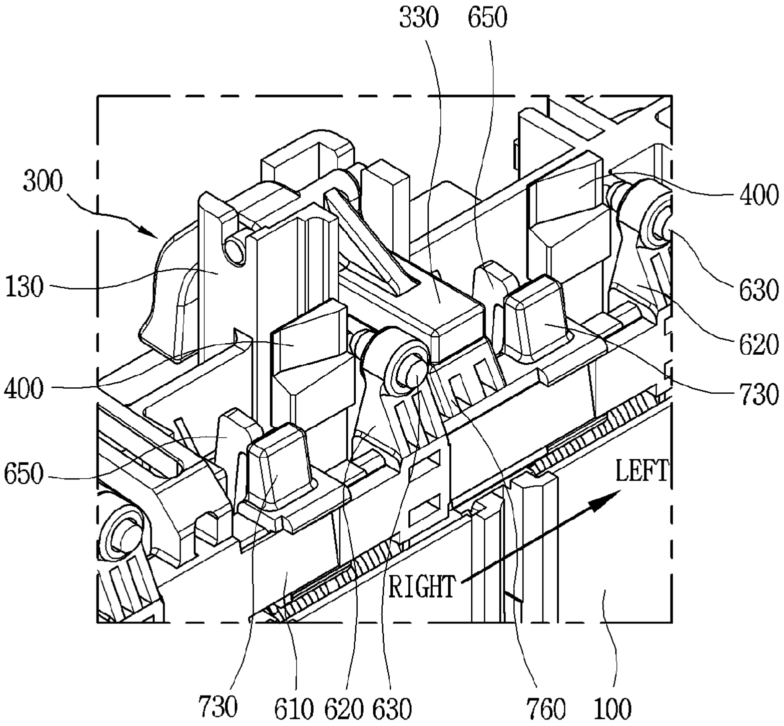
FIG. 10 is a partially-enlarged perspective view illustrating the state of FIG. 9.

Next, a description will further be given of a process of decreasing the shortest distance between the bimetal 400 and the distance adjustment bar 630, with reference to FIGS. 9 and 10.

In the illustrated implementation, the movable crossbar 600 may be slid to the left relative to the fixed crossbar 700. As described above, the movement distance of the movable crossbar 600 may be limited by the coupling between the locking protrusion 623 and the holder insertion portion 711 or the coupling between the insertion protrusion 650 and the insertion space 740.

In addition, the movement may be expressed using the change in a relative distance between the distance adjustment bar holder 620 and the pushed protrusion 730. That is, as the movable crossbar 600 is moved, the distance between the distance adjustment bar holder 620 and the pushed protrusion 730 located adjacent to each other may become the maximum distance d1.

Accordingly, as the movable crossbar 600 is moved to the left, the distance adjustment bar 630 coupled to the distance adjustment bar holder 620 may also be moved to the left. In addition, the bimetal 400 may be disposed such that the shortest distance to the distance adjustment bar 630 is getting shorter toward the left.

This can increase the shortest distance between the bimetal 400 and the distance adjustment bar 630. Also, a reference current value for performing a trip operation may be adjusted to be reduced.

In this case, the fixed crossbar 700 may not move regardless of the sliding of the movable crossbar 600. Accordingly, the shooter support portion 760 of the fixed crossbar 700 on which the crossbar contact portion 330 of the shooter assembly 300 is seated may not move as well.

Accordingly, even if the movable crossbar 600 is moved so that the shortest distance between the bimetal 400 and the distance adjustment bar 630 is reduced, friction may not occur between the crossbar contact portion 330 and the shooter support portion 760.

Figure 11:
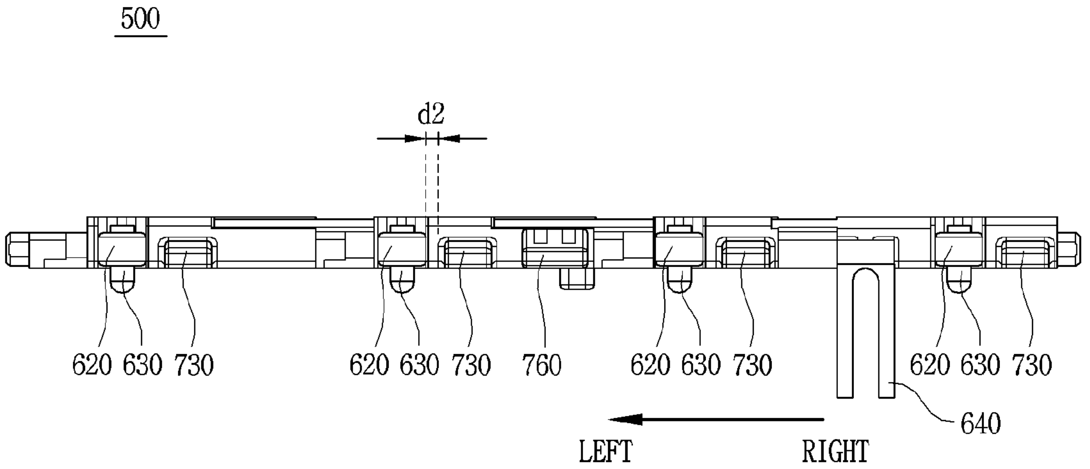
FIG. 11 is a planar view illustrating a state in which the movable crossbar provided in the adjustment crossbar of FIG. 7 is moved to another side.
Figure 12:
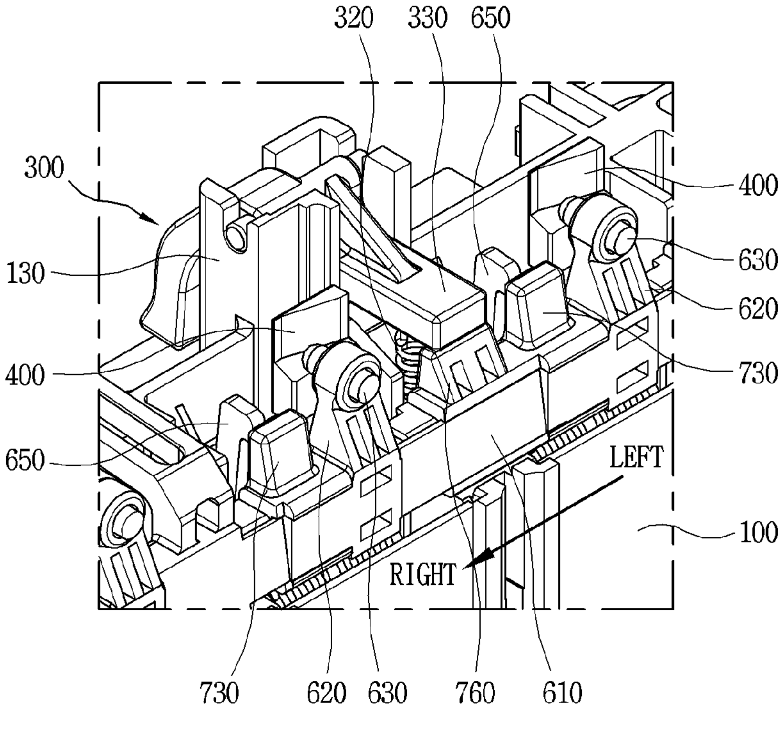
FIG. 12 is a partially-enlarged perspective view illustrating the state of FIG. 11.

Hereinafter, a description will be given of a process of increasing the shortest distance between the bimetal 400 and the distance adjustment bar 630, with reference to FIGS. 11 and 12.

In the illustrated implementation, the movable crossbar 600 may be slid to the right relative to the fixed crossbar 700. As described above, the movement distance of the movable crossbar 600 may be limited by the coupling between the locking protrusion 623 and the holder insertion portion 711 or the coupling between the insertion protrusion 650 and the insertion space 740.

In addition, the movement may be expressed using the change in a relative distance between the distance adjustment bar holder 620 and the pushed protrusion 730. That is, as the movable crossbar 600 is moved, the distance between the distance adjustment bar holder 620 and the pushed protrusion 730 located adjacent to each other may become the minimum distance d2.

Accordingly, as the movable crossbar 600 is moved to the right, the distance adjustment bar 630 coupled to the distance adjustment bar holder 620 may also be moved to the right. In addition, the bimetal 400 may be disposed such that the shortest distance to the distance adjustment bar 630 is getting longer toward the right.

This can increase the shortest distance between the bimetal 400 and the distance adjustment bar 630. Also, a reference current value for performing a trip operation may be adjusted to be increased.

In this case, the fixed crossbar 700 may not move regardless of the sliding of the movable crossbar 600. Accordingly, the shooter support portion 760 of the fixed crossbar 700 on which the crossbar contact portion 330 of the shooter assembly 300 is seated may not move as well.

Accordingly, even if the movable crossbar 600 is moved so that the shortest distance between the bimetal 400 and the distance adjustment bar 630 is increased, friction may not occur between the crossbar contact portion 330 and the shooter support portion 760.

Although it has been described above with reference to the preferred implementations of the present disclosure, it will be understood that those skilled in the art are able to variously modify and change the present disclosure without departing from the scope of the invention described in the claims below.

10: Trip device
100: Frame
110: Accommodating portion
111: Rotation shaft insertion hole
120: Partition wall
130: Shooter coupling portion
200: Pressing unit
210: Heater
220: Magnet
230: Armature
231: Armature rotation shaft
240: Pressing protrusion
300: Shooter assembly
310: Shooter body portion
320: Elastic member
330: Crossbar contact portion
400: Bimetal
500: Adjustment crossbar
600: Movable crossbar
610: Movable body portion
620: Distance adjustment bar holder
621: Extension portion
622: Bar insertion portion
623: Locking protrusion
630: Distance adjustment bar
640: Knob coupling portion
641: Extension portion
**641*a***: First extension portion
**641*b***: Second extension portion
642: Knob insertion portion
650: Insertion protrusion
700: Fixed crossbar
710: Fixed body portion
711: Holder insertion portion
712: Ridge portion
720: Rotation shaft
730: Pushed protrusion
740: Insertion space
750: Support protrusion
760: Shooter support portion
1000: Trip device according to the related art
1100: Trip device case
1110: Armature
1120: Magnet
1130: Heater
1200: Crossbar
1210: Gap adjusting portion
1220: Pushed protrusion
1230: Knob connecting portion
1240: Shooter contact portion
1300: Bimetal
1400: Shooter
1500: Knob
1510: Knob adjusting portion

The invention claimed is:

1. A trip device comprising:
a frame;
a shooter assembly rotatably coupled to the frame; and
an adjustment crossbar rotatably coupled to the frame and configured to be brought into contact with or separated from the shooter assembly,
wherein the adjustment crossbar comprises:
a fixed crossbar extending in one direction, the shooter assembly brought into contact with the fixed crossbar; and
a movable crossbar extending in the one direction and slidably coupled to the fixed crossbar in the one direction;
wherein the fixed crossbar comprises an insertion space recessed into one side thereof facing the movable crossbar; and
wherein the movable crossbar comprises an insertion protrusion protruding from one side thereof facing the fixed crossbar, and inserted into the insertion space.

2. The trip device of claim 1, wherein the insertion space extends by a predetermined distance in the one direction, and
wherein the insertion protrusion is inserted into the insertion space so as to be slidable in the one direction.

3. The trip device of claim 2, wherein the insertion space is provided in plurality disposed to be spaced apart from one another by predetermined distances, and
wherein the insertion protrusion is provided in plurality to be inserted into the insertion spaces, respectively.

4. The trip device of claim 1, wherein the frame defines a predetermined space therein, and
wherein the predetermined space accommodates therein:
a heater electrically connected to an outside; and
a bimetal located adjacent to the heater and configured to be curved toward the adjustment crossbar by heat generated in the heater.

5. The trip device of claim 4, wherein the movable crossbar comprises a distance adjustment bar extending by a predetermined length in a direction toward the bimetal.

6. The trip device of claim 5, wherein the bimetal is formed to be inclined along the one direction in which the movable crossbar extends, such that a distance between the bimetal and an end portion of the distance adjustment bar facing the bimetal is adjusted as the movable crossbar is slid in the one direction.

7. The trip device of claim 1, wherein the frame defines a predetermined space therein, and wherein the predetermined space accommodates therein:

a heater electrically connected to an outside; and a magnet located adjacent to the heater and configured to be magnetized by an electric field formed by a current flowing through the heater; and an armature located adjacent to the magnet and rotatably coupled to the frame.

8. The trip device of claim 7, wherein the armature presses the adjustment crossbar to rotate the adjustment crossbar in a direction away from the shooter assembly when the armature is in contact with the adjustment crossbar and rotates toward the magnet by a magnetic force formed by the magnetized magnet.

9. The trip device of claim 8, wherein the armature comprises an armature rotation shaft rotatably coupled to the frame, and wherein the armature rotation shaft is located between the magnet and the adjustment crossbar.

10. The trip device of claim 8, wherein the fixed crossbar comprises a pushed protrusion protruding from one side thereof to be away from the predetermined space of the frame, and wherein the armature has one end portion facing the adjustment crossbar located adjacent to the pushed protrusion.

11. The trip device of claim 1, wherein the shooter assembly extends toward the fixed crossbar to cover the fixed crossbar, and wherein the fixed crossbar comprises a shooter support portion protruding toward the shooter assembly, such that the shooter assembly is seated thereon.

12. The trip device of claim 1, wherein the fixed crossbar comprises a rotation shaft disposed to protrude from both end portions of the fixed crossbar, and rotatably coupled to the frame.

13. The trip device of claim 1, wherein an elastic member is disposed below the shooter assembly to elastically support the shooter assembly, and wherein the shooter assembly is rotated toward the elastic member when the fixed crossbar is rotated.

* * * * *